United States Patent
Okita et al.

(10) Patent No.: US 9,661,143 B1
(45) Date of Patent: May 23, 2017

(54) MULTI-TENANT SERVICE

(71) Applicant: SHORETEL, INC., Sunnyvale, CA (US)

(72) Inventors: Glen K. Okita, Los Altos, CA (US);
Amy S. Pendleton, Austin, TX (US);
Howard H. Yin, Saratoga, CA (US)

(73) Assignee: Shoretel, Inc., Sunnyvale, CA (US)

( * ) Notice: Subject to any disclaimer, the term of this patent is extended or adjusted under 35 U.S.C. 154(b) by 491 days.

(21) Appl. No.: 14/208,761

(22) Filed: Mar. 13, 2014

Related U.S. Application Data

(60) Provisional application No. 61/778,833, filed on Mar. 13, 2013.

(51) Int. Cl.
*H04M 3/00* (2006.01)
*H04M 5/00* (2006.01)
*H04M 3/56* (2006.01)
*H04M 3/51* (2006.01)

(52) U.S. Cl.
CPC .......... *H04M 3/567* (2013.01); *H04M 3/5125* (2013.01); *H04M 3/5183* (2013.01)

(58) Field of Classification Search
CPC ..................... H04M 3/5183; H04M 3/5125
USPC ........................ 379/265.02, 265.09
See application file for complete search history.

(56) References Cited

U.S. PATENT DOCUMENTS

| | | |
|---|---|---|
| 8,560,571 B1 | 10/2013 | Kuruganti et al. |
| 2006/0251236 A1* | 11/2006 | Peters .............. H04L 29/06027 379/265.01 |
| 2011/0302133 A1 | 12/2011 | Kuruganti et al. |
| 2012/0166488 A1 | 6/2012 | Kaushik et al. |
| 2012/0321070 A1* | 12/2012 | Smith ................. H04M 3/5231 379/265.09 |
| 2013/0145006 A1 | 6/2013 | Tammam |
| 2013/0251129 A1* | 9/2013 | Jasper ................. H04M 3/5237 379/112.05 |
| 2014/0270142 A1* | 9/2014 | Bischoff ............. H04M 3/5237 379/265.09 |

* cited by examiner

*Primary Examiner* — Nafiz E Hoque
(74) *Attorney, Agent, or Firm* — Tarolli, Sundheim, Covell & Tummino LLP

(57) ABSTRACT

A multi-tenant management service (MTMS) can be configured to receive a plurality of requests for a multi-tenant service from a plurality of tenants. A given and another of the plurality of tenants can have a resource object (RO) with the same dialable number (DN) assigned thereto. The MTMS can also be configured to generate a federated dial plan for each of the plurality of tenants. Each federated dial plan can include a system identifier (ID) and a corresponding DN for each RO associated a respective tenant. The MTMS can further be configured to provide a federated DN corresponding to the multi-tenant service to each of the plurality of tenants.

25 Claims, 4 Drawing Sheets

| FEDERATED DN | | | | |
|---|---|---|---|---|
| SYSTEM ID | DN | RO ID | USER PROFILE | |
| 14 | 123 | XXX.XX | BILL SMITH | |
| 14 | 124 | XXX.XX | BOB HAMILTON | |
| 14 | 226 | XXX.XX | DAVE LOTS | |

50

| FEDERATED DN | | | |
|---|---|---|---|
| SYSTEM ID | DN | RO ID | USER PROFILE |
| 14 | 123 | XXX.XX | BILL SMITH |
| 14 | 124 | XXX.XX | BOB HAMILTON |
| 14 | 226 | XXX.XX | DAVE LOTS |

MULTI-TENANT SERVICE

CROSS-REFERENCE TO RELATED APPLICATIONS

This application claims the benefit of priority to U.S. Provisional Application No. 61/778,833, filed on Mar. 13, 2013, and entitled HYBRID PREMISES AND CLOUD BASED USER SYSTEM FOR INTEGRATING AND SUPPORTING CALL CONTROL, the contents of which is incorporated herein by reference in its entirety.

TECHNICAL FIELD

This disclosure relates to systems and methods for deploying a service to multiple tenants.

BACKGROUND

A private branch exchange (PBX) is a telephone exchange or switching system that serves an organization and performs concentration of central office lines or trunks and provides intercommunication between telephone stations in the organization. The central office lines provide connections to the public switched telephone network (PSTN) and the concentration aspect of a PBX permits the shared use of these lines between all stations in the organization. The intercommunication aspect of the PBX allows two or more stations to establish telephone or conferencing calls between them without using the central office lines.

Hybrid cloud computing relates to a composition of two or more clouds (private, community or public) that remain unique entities but are bound together, offering the benefits of multiple deployment models. Such composition can expand deployment options for cloud services, allowing information technology (IT) organizations to use public cloud computing resources to meet certain needs. By utilizing "hybrid cloud" architecture, companies and individuals are able to obtain degrees of fault tolerance combined with locally immediate usability without dependency on internet connectivity. Hybrid cloud architecture requires both on-premises resources and off-site (remote) server-based cloud infrastructure.

SUMMARY

This disclosure relates to deploying multi-tenant services from a data center.

One example relates to a non-transitory computer readable medium storing machine readable instructions that include a multi-tenant management service (MTMS) that can be configured to receive a plurality of requests for a multi-tenant service from a plurality of tenants. A given and another of the plurality of tenants can have a resource object (RO) with the same dialable number (DN) assigned thereto. The MTMS can also be configured to generate a federated dial plan for each of the plurality of tenants. Each federated dial plan can include a system identifier (ID) and a corresponding DN for each RO associated a respective tenant. The MTMS can further be configured to provide a federated DN corresponding to the multi-tenant service to each of the plurality of tenants.

Another example relates to a system that includes an MTMS. The MTMS can be configured to generate a federated dial plan for a tenant in response to a request for a selected service. The federated dial plan can include a system ID and a DN for each RO associated with the tenant. The MTMS can also be configured to provide the federated dial plan for the tenant to a multi-tenant private branch exchange (MT PBX). The MTMS can further be configured to provide a federated DN for the selected service to a private branch exchange (PBX) of the tenant. The MT PBX can include a multi-tenant director configured to program a trunk switch of the MT PBX such that a call to the federated DN of the selected service from an RO of the tenant is routed to the selected service.

Yet another example relates to a method that can include receiving a dial plan from a tenant in response to ordering a selected service. The dial plan can include a DN for a plurality of ROs at the tenant. The method can also include generating a federated dial plan that includes the DNs for each of the plurality of ROs at the tenant and a system identifier for the tenant. The method can further include providing a federated DN for the selected service to a PBX of the tenant.

DETAILED DESCRIPTION

This disclosure relates to deploying one or more multi-tenant services, such as from a data center. A selected service can be deployed from the data center to a plurality of tenants on an "as needed" basis. Each tenant can include a plurality of resource objects (ROs) (e.g., telephones or other devices) that each have a dialable number (DN) (e.g., short number dialing, such as an extension number, and/or direct dial number) assigned thereto. The data center can include a multi-tenant management service (MTMS) configured to generate a federated dial plan for each tenant (or some subset thereof) that includes a system identifier (ID) for each tenant as well as the DNs for each RO of each tenant. In this manner, each RO can be uniquely addressed, even if dial plans (e.g., non-federated dial plans) are overlapping, such that one or more of the same DNs are employed at multiple tenants. The MTMS can also be configured to provide each tenant with controlled access to one or more selected services by dialing a federated DN associated with the selected service during a specific time period. By implementing the data center, the tenants can avoid purchasing dedicated hardware that would implement the selected service. Additionally, employment of the federated dial plans enables for unified communications between the tenants.

Figure 1:
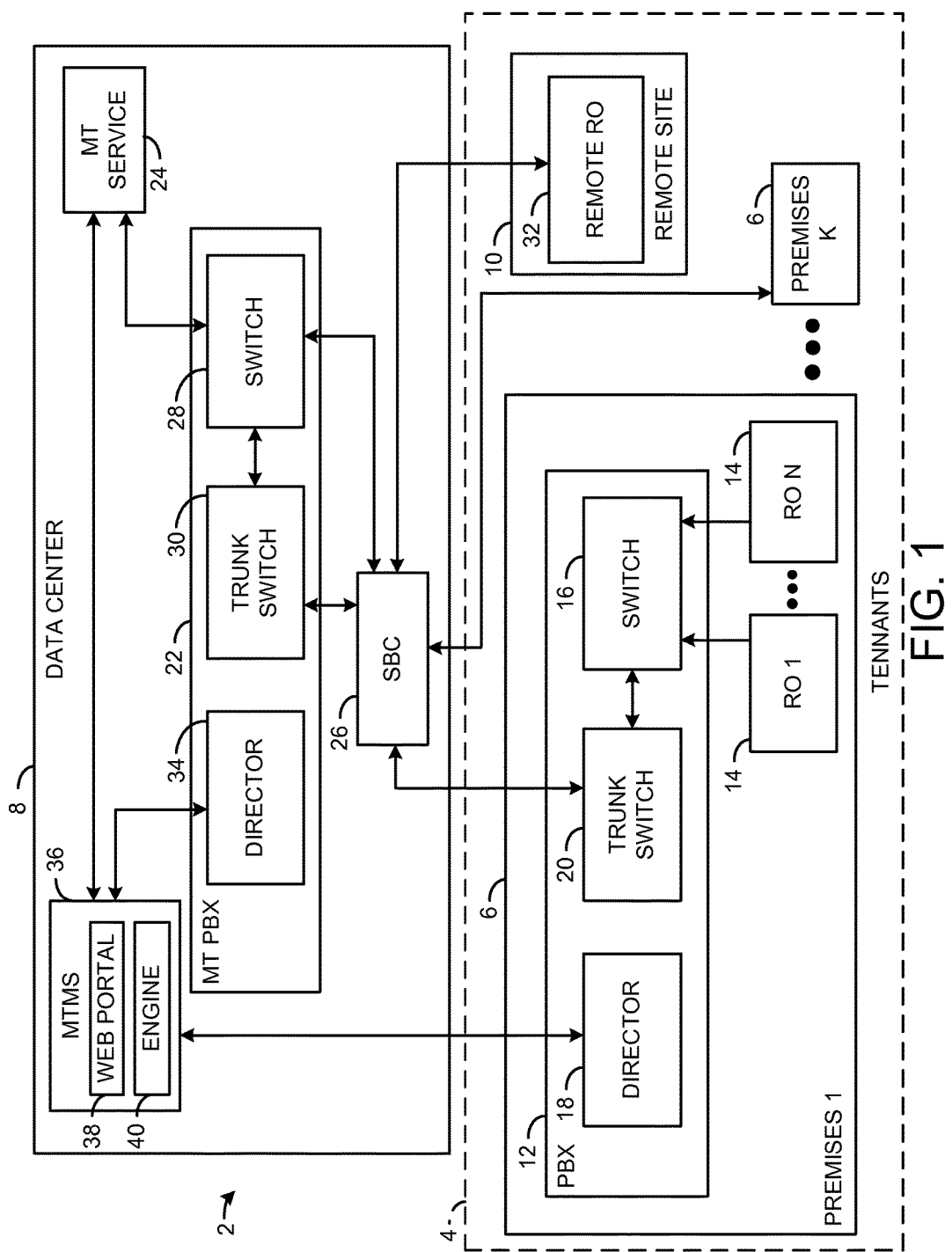
FIG. 1 illustrates an example of an enterprise system to deploy a service.

FIG. 1 illustrates an example of an enterprise system 2 for deploying one or more services to multiple tenants 4. The system 2 can include the multiple tenants 4 that communicate with a data center 8. The tenants 4 can include, for example, K number of premises 6 (e.g., an office or other location) where K is an integer greater than or equal to one. The tenants 4 can also include one or more remote sites 10 (e.g., a mobile location) that can have minimal on-site hardware. The data center 8 could be implemented, for example, as a computing cloud, another premises 6 or other arrangement of a multi-tenant services system.

For purposes of simplification of explanation, only the details of the first premises 6 ("PREMISES 1") is illustrated and described. The remaining $2^{nd}$ to Kth premises 6 can be implemented in a similar or different manner. The first premises 6 can include a private branch exchange (PBX) 12 that can control communications (e.g., audio, visual or a combination thereof) for users of the first premises 6. Each of the premises 6 can be implemented as a private network that can include a variety of resources for controlling communications, including the PBX 12.

The PBX 12 provides a communications exchange that services a particular entity corresponding to the premises (e.g., a business that may include one or more offices). This is in contrast to a common carrier (e.g., telephone service provider) that operates for many businesses or for the general public. For instance, the PBX 12 of the premises 6 can communicate with a service provider, such as via a network (not shown). Thus, the PBX 12 can include hardware (e.g., switches, logic lines, routers, conferencing systems, and other controls) and/or software configured to couple to the network for sending and receiving communications to and from the premises 6 as well as for routing, distributing and managing communications within the premises. The PBX 12 can be configured to implement packet switched calls, such as implementing voice over internet protocol (VoIP), circuit switched calls or a combination of packet and circuit switched communications.

For example, N number of resource objects (ROs) 14 can communicate with the PBX 12, where N is an integer greater than or equal to one. Each of the N number of ROs 14 could be implemented, for example, as a desktop phone, a mobile phone, (e.g., a wireless phone or a smartphone), a virtual phone (e.g., software executing on a computer) or the like. Each of the N number of ROs 14 can be connected to a switch 16 (e.g., a network switch) of the PBX 12 configured to control signaling between the RO 14 and the PBX 12. Each of the N number of ROs 14 can have an extension number (or other short number dialing) and/or direct dial number that distinguishes a given RO 14 from the other of the N number of ROs 14 within the first premises 6. The extension number could be, for example an M digit number, where M is an integer greater than or equal to one. For example, if M is 3, the extension number for of the N number of the given RO 14 could be a number from 001 and 999.

In many instances, a user of the given RO 14 of the N number of ROs 14 can dial an extension number and/or direct dial number of another RO 14 of the N number of ROs 14 that is located at the first premises 6 and the switch 16 can establish a bidirectional communication path between the two ROs 14. The number dialed at a given RO 14 to connect to another RO 14 (e.g., an extension number or direct dial number) can be referred as a dialable number (DN). In some examples, a service such as On-Net Dialing (OND) can be enabled to allow the given RO 14 to connect to the other RO 14 by simply dialing (only) the DN.

OND can be implemented as a mechanism that allows a dial plan to be partitioned into groups, often by a physical office or site, and in some cases by departments or other organizational boundaries. When OND is enabled, a user can dial other ROs that are part of the same portion of the phone network office by simply dialing a short extension number. To reach extensions that are not part of the same portion of the phone network, a prefix (or other number) may be dialed that is assigned to the group of numbers that the extension is part of. Off System Extensions (OSEs) are a mechanism to identify extensions that are not on the system, but can be dialed as extensions.

The dial plan for each of the tenants 4 can define rules for assigning extensions within a tenant 4 and/or the enterprise system 2. For instance, the dial plan can include rules that specify that particular digits, such as '9' and '0' are reserved digits, such that no extension number begins with '9' or '0'. In such a situation, the digit '0' can be used either for an Operator or as a TAC and '9' can be reserved for emergency dialing (e.g., "911") and/or dialing an external number. Further, the dial plan may specify that 8 is pseudo-reserved, such that an extension can begin with '8' in some situations.

The PBX 12 can include a director 18 that can control operations of the PBX 12. The director 18 can be implemented, for example, as software (e.g., machine readable instructions executing on a processor), hardware (e.g., an application specific integrated circuit (ASIC) chip) or a combination thereof (e.g., firmware). The director 18 can be configured, for example, to assign and/or change the DNs of the N number of ROs 14. Additionally, in some examples, the director 18 can be configured to assign profiles (e.g., user profiles and/or service profiles) to one or more of the N number of ROs 14.

For example, the director 18 could be configured to create a profile for a user named "John Smith" and assign that user profile to a first RO 14 (e.g., RO 1) of the N number of ROs 14. In this manner, the first RO 14 could be identified by either the DN associated with the first RO 14 or the name of the user profile. A directory of the first premises 4 can be stored at PBX 12, and the directory can include, for example user profiles and DNs, as well as other information.

The PBX 12 can also include a trunk switch 20 (e.g., a Session Initiation Protocol (SIP) trunk switch) that can be configured to communicate with external systems. The trunk switch 20 can communicate with the switch 16 to allow users of the N number of ROs 14 to dial a telephone number to establish bidirectional communication with another communication endpoint (e.g., another telephone) that is not associated with the first premises 6. In such situations, information, including a directory and/or a dial plan of a tenant 4 and/or the data center 8 can, in some examples, be transmitted using a series of SIP messages. In other examples, the information can be provided over another protocol such as an authenticated Hypertext Transfer Protocol Secure (HTTPS) session in a manner described herein. As used herein, the term "trunk switch" can refer to multiple instances of a trunk switch 20 and/or a trunk switch 30 that can connect to a plurality of different systems to support connectivity with different types of trunks. For instance, the trunk switch 20 can be configured to establish communication with the public switched telephone network (PSTN) to establish communication between the first RO 14 and the other communication endpoint.

The PBX 12 can communicate with a multi-tenant (MT) PBX 22 included at the data center 8. The MT PBX 22 can be configured in a manner similar to the PBX 12 of the first premises 6. In some examples, as explained herein, the MT PBX 22 and the PBX 12 can implement a service such as Off System Extensions (OSEs) that can be implemented to allow the PBX 12 to route calls to DNs (extensions) that are outside of the first premises 6 by dialing the system ID and the DN together (the federated DN).

The tenants 4 that are associated with a common MT PBX, such as the MT PBX 22 can have dial plans that specify that each DN (extension) is the same number of digits (e.g., the same length). In some situations, there can be multiple instances of MT PBX 22 for 3-digit extensions, 4-digit extensions, etc. Accordingly, the dial plan of the MT PBX 22 can include rules that specify a length of extensions for associated tenants 4.

The data center (e.g., cloud) 8 can include a variety of hardware and/or software resources that can be supported in a given cloud, including servers, branch exchanges, routers and databases, for example. Such resources can include processors, memory, servers, software, applications, that cooperate to provide cloud computing capabilities for users and premises based systems that desire to exploit cloud resources that enhance existing functionality of their premises based system.

In the example of FIG. 1, the data center 8 can include a MT service 24 that can be configured to provide communication services to external systems, such as the tenants 4. Additionally, as explained herein, the data center 8 can concurrently provide the MT service 24 to multiple tenants 4, such as the first to Kth premises 6 and the remote site 10. The MT service 24 could include, for example, an enterprise contact center (ECC), instant messaging (IM) service, a unified communication bridge (e.g., an audio, web meeting, and/or video conferencing service), connect service or the like. Additionally, in some examples, the MT service 24 can be implemented as multiple instances of a service. In other examples, a single MT service 24 can be configured to provide a plurality of different services.

The data center 8 can include a session border controller (SBC) 26 to exert control over the signaling and/or media streams involved in setting up, conducting, and tearing down telephone calls or other communication sessions. Additionally, the SBC 26 can operate as a firewall for the data center 8. The SBC 26 can monitor communications with the data center 8 and external systems to prevent, for example, malicious code, denial of service (DoS) attacks or the like. The SBC 26 can also facilitate connectivity between networks, such as network application translation (NAT) traversal, SIP normalization, network protocol translation (e.g., Internet Protocol (IPv4) to IPv6 translation), quality of service (QoS) control or the like.

The MT service 24 can communicate with a switch 28 of the MT PBX 22. The switch 28 can control signaling to and from the MT service 24. The MT PBX 22 can include a trunk switch 30 (e.g., a SIP trunk switch) configured to connect the MT service 24 to external systems via the switch 28.

In some examples, a remote site 10 (e.g., a mobile site) can communicate with the data center 8. The remote site 10 can include a remote RO 32, such as a mobile phone (e.g., a wireless phone or a smart phone), a virtual phone (e.g., software executing on a computer), a desktop phone or the like. The remote RO 32 can communicate with the switch 28 via the SBC 26. Additionally, in some examples, the remote RO 32 can traverse an external network, such as a carrier network and/or the Internet to reach the SBC 26. The remote RO 32 can also be authenticated and registered for operation within a given premises 6, such as by communicated with the PBX via a network.

The MT PBX 22 can also include a director 34 configured to control assignment of DNs (e.g., extension numbers and/or direct dial numbers) to services and/or ROs 14 (e.g., the remote RO 32) associated with the data center 8. Additionally, the director 34 of the MT PBX 22 can be configured to associate profiles with the DNs. A directory of the data center 8 stored at the MT PBX 22 can include the profiles and the associated DNs, as well as other information.

The data center 8 can include a multi-tenant management service (MTMS) 36. The MTMS 36 can be configured to setup and maintain services and communication between the K number of premises 6, the data center 8 and/or the remote site 10. The MTMS 36 can also be configured to perform billing operations related to the deployment and implementation of such services. In some examples, the MTMS 36 can include a web portal 38 that can be accessed through the Internet. The web portal 38 can provide a graphical user interface (GUI) that can allow a user to select features and/or services that are to be provided to a system. Additionally, the web portal 38 can allow only a subset of profiles and/or extensions of particular premises 6 to access the selected features and/or services. In one example, a user of the first premises 6 can access the web portal 38 of the MTMS 36 to select a particular service (e.g., a selected service) and a time frame that the selected service is to be provided the first premises 6.

As noted, the PBX 12 can implement OSEs to allow the PBX 12 to route calls to DNs (extensions) that are outside of the first premises 6. The OSE can be implemented as a mechanism that facilitates call routing between the MT PBX 22 and the PBX 12. In some examples, the users of a given RO 14 can dial a DN and can be routed to another communication endpoint (e.g., the remote RO 32) without dialing a system ID (or an associated prefix) followed by the DN of the other communication endpoint. For example, in some situations, the PBX 12 can be configured to recognize situations when the inclusion of the system ID is needed, and the PBX 12 and/or the MT PBX 22 can prepare the system ID and prepend the system ID to the DN that the user dials. In such a situation, the prepending might be executed before a call leaves the trunk switch 20 of the PBX 12 or the trunk switch 30 of the MT PBX 22, depending on the direction of the call. Alternatively, the prepending might be executed when the call enters a local PBX. Accordingly, from a perspective of a user of the given RO, the number dialed by the user (e.g., the DN) does not change whether the other RO is a local RO or a remote RO (e.g., a cloud RO).

In some examples, the remote site 10 can implement a SIP tie trunk (or other protocol) on the PBX 12 of the first premises 6 (or other premises 6). In such a situation, OSE ranges for that trunk can be automatically synchronized with the list of federated DNs (e.g., a directory). For instance, as federated users are provisioned on the MT PBX 22, a corresponding federated DN can be automatically added. The capacity of the SIP trunk switch for the tie trunk can be provided by the PBX of the first premises 6. In addition, DNs on either the first premises 6 or the remote site 10 can be exposed via OSE. For example, if a Hunt Group is defined on the MT PBX 22, then the Hunt Group can be exported to the PBX 12 of the first premises 6 and an OSE entry can be created for the Hunt Group at the PBX 12 of the first premises 6.

Similarly, DNs on the PBX 12 of the first premises 6 can be exported to the MT PBX 22 and a corresponding MT PBX trunk group for the tenant associated with the first premises 6 can be adjusted. The OSE manipulation can include automatic insertion and/or removal of the system ID (and an associated prefix) as necessary. Moreover, the PBX 12 of the first premise 6, can add/modify one or more trunk groups that can be designated in the director 18 as the tie to a hybrid system (where the remote site 10 is considered a cloud based tenant). Further, the trunk groups associated with a particular tenant 4 can be marked with a tenant identifier (TenantID) by the MT PBX 22, such that DNs on another system can be created as OSEs for these trunk groups.

In some examples, MTMS 36 can be implemented as a billings and operations support services (BOSS). For instance, the MTMS 36 can be configured to control configuring and provisioning the MT service 24, configuring devices and components in the data center 8 and supporting business operations for customers such as by supporting processes, processing bills and collecting payments. The MTMS 36 can be configured to facilitate synchronization between the director 34 of the MT PBX 22 and the director 18 of the PBX 12 of the first premises 6 (or other premises 6). Such synchronization can include, for example, the exchanging of information (e.g., a directory and/or a dial plan of a tenant 4 and/or the data center 8) via an authenticated HTTPS session controlled by the MTMS 36 or another protocol, such as SIP. In some examples, the MTMS 36 can be configured to establish and manage an account for each of the tenants 4 and/or for specific users of the tenants 4. For instance, the MTMS 36 can generate an account ID for a new customer that can be provided through the web portal 38 to one or more authorized users for use in establishing services in the data center 8. Data associated with the given account can be stored in an account database such as part of configuration data for the account.

The level of services provided to each tenant 4 can be controlled according to a service level agreement between a host entity of the data center (e.g., a business) and the entity in control over the tenant (e.g., another business or a person). The MTMS 36 can be configured to track usage by each of the tenants 4 of the respective ROs 14 and/or the remote RO 32 and store such usage in account data in the account database. The account data can in turn be tracked for billing services depending upon a subscription and/or other ways in which the premises based system contracts for use of the hosted resources.

In a first example, (hereinafter, "the first example"), the user can employ the web portal 38 of the MTMS 36 to select a service, namely a unified communications bridge for the first premises 6. Additionally, in the first example, the time frame can be 24 hours, and only the first RO 14 of the N number of ROs 14 is permitted to access the selected service. In some examples, the user can also agree upon payment terms, which could be per-use fees, per hour fees or the like. In response, an engine 40 of the MTMS 36 can query the director 18 of the PBX 12 at the first premises 6 for the dial plan of the first premises 6. The engine 40 can include, for example, an application programming interface (API) that can be employed to access functions or methods programmed to control operations of the MTMS 36. In response, the director 18 of the first premises 6 can provide the dial plan of the first premises 6 to the MTMS 36.

The engine 40 of the MTMS 36 can be configured to analyze the dial plan of the first premises 6 to determine if the dial plan of the first premises 6 is compatible with the dial plan of MT PBX 24. For example, in some situations, the data center 8 may have a plurality of MT PBX 24s. In such a situation, each PBX 12 may be configured to interoperate with a particular MT PBX 24. For example, if the PBX 12 of the first premises 6 has a dial plan that defines a 3 digit extension length, the PBX 12 may be configured to interoperate with a given MT PBX 22. In another example, if the PBX 12 of the first premises 6 includes a dial plan that defines a 4 digit extension length, the PBX 12 of the first premises may be configured to interoperate with another MT PBX 22.

The engine 40 of the MTMS 36 can assign a system identifier (ID) to the dial plan. The system ID can be unique to the first premises 6. The system ID can be associated with, for example, an extension prefix or suffix added for each DN of the dial plan. Moreover, in some situations, the same system ID can be associated with multiple extension prefixes or suffixes. Thus, the system ID can be determined from a given prefix or suffix and vice versa. For instance, if the PBX 12 of the first premises 6 employs a three digit extension configuration, the system ID can be associated with a two digit extension (e.g., a prefix). It is noted that the number of digits in the prefix associated with the system ID can vary based on the K number of premises 6 that communicate with the data center 8. The system ID (e.g., associated with the extension prefix) and the DN collectively can be referred to as a federated DN. The engine 40 of the MTMS 36 can generate a federated directory for the first premises 6 that includes each federated DN, as well as profiles of the first premises 6, such that each of the ROs 14 at the first premises 6 can be uniquely identified. Moreover, a federated dial plan for the first premises 6 can be generated by the engine 40 and can include, for example, the rules for assigning DNs to ROs of the first premise 6, as well as the DNs and the associated system ID.

Figure 2:
FIG. 2 illustrates an example of a federated directory.

FIG. 2 illustrates an example of a federated directory 50 that could be employed, for example, as the federated directory for the first premises 6 of FIG. 1. The federated dial directory 50 can include, for example a federated DN for each RO 14 at the first premises 6. The federated DN can include fields such as the system ID (e.g., associated with an extension prefix) that uniquely identifies the first premises 6 from other tenants 4. In FIG. 2, the system ID is illustrated as a two digit number. The federated directory 50 also includes a DN for each RO, which is illustrated as a three digit number. The federated directory 50 can also include an RO ID that can provide another identifier of each RO. In some examples, the RO ID can be an IP address or a uniform resource identifier (URI) of a corresponding RO, a media access control (MAC) address of each RO 14 or the like. Furthermore, the federated directory 50 can include a profile identifier that can identify a profile associated with each RO. In this manner, each RO 14 can be uniquely identified in a plurality of different ways. Additionally, other tenants 4 can have ROs 14 with the same DNs, since the system IDs can differ. In such a situation, the directories (e.g., non-federated directories) can be considered to be "overlapping". In some examples, the federated dial directory 50 can also include information not illustrated in FIG. 2.

Referring back to FIG. 1, the engine 40 of the MTMS 36 can communicate with the director 34 of the MT PBX 22 to provide the federated dial plan for the first premises 6. Additionally, the engine 40 of the MTMS 36 can configure the MT service 24 (e.g., the unified communications bridge) for the first premises 6. In the first example, the engine 40 of the MTMS 36 can push the list of permitted extension numbers and/or direct dial numbers (e.g., the first RO) and the federated dial plan to the MT service 24. Additionally, the engine 40 of the MTMS 36 can extract relevant access information (e.g., username, password, DNs or the like) for the MT service 24. The engine 40 of the MTMS 36 can push the relevant information to the director 18 along with a federated DN (e.g., a system ID and a DN) for the MT service 24 to the director 18 of the PBX 12 of the first premises 6. The director 18 of the MT PBX 22 can be configured to program the trunk switch 30 of the MT PBX 22 such that requests for access to the selected service that are provided by a federated DN of the first premises 6 are routed to the switch 28 and to the MT service 24 (the selected service).

Additionally, the director 18 of the PBX 12 of the first premises 6 can configure the trunk switch 20 such that requests for access to the federated DN of the selected service are routed to the SBC 26 of the MT PBX 22 to establish bidirectional communication between the trunk switch 30 of the MT PBX 22 and the trunk switch 20 of the PBX 12 of the first premises 6 (e.g., via SIP trunking, tie trunking or the like).

Accordingly, during the time frame in the initial set up through the web portal 38, calls made by the first RO 14 to the federated DN associated with the selected service are routed through the switch 16 and trunk switch 20 of the first premises 6, to the SBC 26 of the data center 8, through the trunk switch 30 and the switch 28 of the MT PBX 22 and to the MT service 24 at the data center 8. To make the call to the federated DN associated with the selected service, a user of the first RO 14 can employ a dialing assistor, such as communication software that executes on a computer. Additionally or alternatively, the user can dial a system ID (e.g., associated with an extension prefix) associated with the data center 8 and the DN associated with the selected service. In this manner, even if there is another RO 14 of the N number of ROs 14 at the first premises 6 that employs the same DN as the MT service 24 (e.g., overlapping DNs), conflicts between DNs can be avoided. Additionally, the MT service 24 can deny access to ROs 14 that have not been authorized (through the web portal 38) for access.

The MT service 24 can provide the selected service to a connected caller (e.g., an authorized RO). In the first example, the MT service 24 can be configured to provide a unified conference bridge. Thus, the MT service 24 can allow the connected caller to establish audio, web, and/or video communication with other communication endpoints, including other ROs 14 at the first premises 6 or communication endpoints external to the system 2. Moreover, in some examples, the MT service 24 can communicate with the MTMS 36 to record usage and determine billing information that can vary based on terms of a services agreement between the data center 8 and the business entity to which the premises 6 belongs.

Continuing with the first example, after the time frame specified during the initial setup, the MTMS 36 can configure the MT service 24 to be disabled for the first premises 6. In such a situation, further attempts to access the MT service 24 by the first RO 14 can be denied by the MT service 24. In some examples, the MTMS 36 service may not reconfigure the director 18 to remove access to the MT service 24 such that the selected service can be readily be re-instated. In fact, in some examples, the web portal 38 of the MTMS 36 can provide a menu that allows the selected service to be quickly re-instated. In other examples, the MTMS 36 can instruct the director 34 of the MT PBX 22 to remove the federated dial plan of the first premises 6, such that the director 34 can reconfigure the trunk switch 30 of the MT PBX 22. Additionally, in the first example, another request from another premises 6 (e.g., one of premises 2-K) can be handled in a similar manner. In this manner the data center 8 can concurrently provide the MT service 24 to multiple tenants 4.

In a second example (hereinafter, "the second example"), a user at the first premises 6 can access the web portal 38 of the MTMS 36 to order the MT service 24, which can be a connect service. In the present examples, the connect service can facilitate a bridging of premises, such as the first premise 6 with another premises 6 and/or the remote site 10, such that upon activation of the connect services, each of the bridged premises operate as a common tenant 4. In the second example, for such a connect service, DNs associated with the Kth premises 6 (premises K) and the remote RO 32 at the remote site 10 can made accessible to the N number of ROs 14 (or in other examples, a subset of the N number of ROs 14) for a specific time period (e.g., 1 week). In the second example, the authorized user (e.g., administrator) can also agree to billing terms at the web portal 38 of the MTMS 36. In the second example, it is presumed that some of the ROs 14 associated with the first premises 6 and/or some of the ROs associated with the Kth premises 6 can be deployed on a cloud, such that these ROs can be considered "cloud ROs". Additionally, in the second example, the data center 8 can be operating on a cloud, and the remote RO 32 can be considered a "cloud RO". In this manner, in the second example, the system 2 can be hybrid cloud, where some hardware (e.g., the PBX 12 or some portions thereof) can be physically located at a premises (e.g., premises deployed equipment). Additionally, in the second example, some hardware (e.g., another PBX) can be virtual hardware located in the cloud (e.g., cloud deployed equipment), such that premises deployed equipment can interoperate with cloud deployed equipment. Accordingly, the connect service can be considered a "hybrid service" that facilitates interoperation of a cloud based system and a premise based system.

In the second example, the engine 40 of the MTMS 36 can receive a dial plan for the first premises 6, the Kth premises 6 and the remote site 10. In response, the MTMS 36 can assign a system ID to each of the first premises 6, the Kth premises 6 and the remote site 10. In some examples where the remote RO 32 is registered for use in one of the premises 6, the system ID of the remote site 10 can be the same as such premises. In other examples, the remote RO 32 can be registered for use in multiple premises 6. In these situations, the remote RO 32 can have the system ID associated with the data center 8 or the system ID associated with any such multiple premises 6. In still other examples, the remote RO 32 can have a unique system ID assigned thereto. The system ID can be associated with, for example, an extension prefix, suffix or other identifier that is added to the local DN for a given premises 6. Accordingly, each RO 14 at the first premises 6, the Kth premises 6 and the remote site 10 can have a unique identifier, which can include an associated system ID and a DN, which unique identifier can form a corresponding federated DN. In the second example, the engine 40 of the MTMS 36 can generate a federated dial plan for each of the first premises 6 and Kth premises 6 as well as the remote site 10. The federated dial plan can include federated DNs that can be employed to uniquely identify each RO 14 of the system 2 as well as rules for assigning DNs to ROs of the system 2.

The engine 40 of the MTMS 36 can push the federated dial plans to the director 34 of the MT PBX 22. Additionally, the MTMS 36 can push the federated dial plans to the MT service 24 (the connect service). Furthermore, the engine 40 of the MTMS 36 can push the federated dial plan for the remote site 10 as well as the federated dial plan for the Kth premises 6 to the director 18 of the PBX 12 at the first premises 6. Similarly, the engine 40 of the MTMS 36 can push the federated dial plan for the remote site 10 and the first premises 6 to the director of the Kth premises 6. In this manner, the MT PBX 22 and the PBX 12 at the first and Kth premises 6 and the MT PBX 22 can have a unified directory that includes unique identifiers (e.g., the federated DN and/or an associated profile) of ROs 14 at the first and Kth premises 6 as well at the remote location.

The director 18 of the PBX 12 at the first premises 6 can configure the trunk switch 20 of the PBX 12 such that calls directed to the federated DN associated with either the remote RO 32 or a RO 14 of the Kth premises 6 are routed to the trunk switch 30 of the MT PBX 22 (via the SBC 26 of the MT PBX 22). In a similar manner, the director of the Kth premises 6 can configure the trunk switch 20 of the PBX 12 at the Kth premises 6 such that a call to a federated DN associated with either the remote RO 32 or the first premises 6 is directed to the trunk switch 30 of the MT PBX 22 (via the SBC 26 of the data center 8). In some examples, the PBX 12 at the first premises 6 may have additional trunks and/or trunk switches that are not utilized for federated DNs. In such a situation, the director 18 of the PBX 12 at the first premises 6 can configure such trunks and/or trunk switches so that it can be determined which trunks and/or trunk switches have this capability.

Additionally, in the second example, the MT service 24 can control the MT PBX 22 (e.g., via the switch 28) to cause the director 34 of the MT PBX 22 to program/configure the trunk switch 30 to route (e.g., via SIP trunking, tie trunking or other protocol) calls originating from the first or Kth premises 6 to the appropriate RO to provide the selected connect service in the second example. For instance, if the first RO 14 of the first premises 6 calls a federated DN of a given RO at the Kth premises 6, the MT service 24 can cause the trunk switch 20 at the PBX 12 of the first premises 6 to connect (via the SBC 26 of the data center 8) to the trunk switch 30 of the MT PBX 22. In response, the MT PBX 22 can route the call to the trunk switch of the Kth premises 6, which trunk switch can employ SIP trunking, tie trunking (or another protocol) to establish a connection between the first RO 47 at the first premises 6 and the given RO at the Kth premises 6, such that the selected connect service can be provided. Moreover, the MT service 24 can collaborate with the MTMS 36 to implement billing services based upon the agreed to terms specified in a service level agreement.

Further, continuing with the second example, if the first RO 14 at the first premises 6 dials the federated DN of the remote RO 14 at the remote site 10, the MT service 24 can cause the trunk switch 20 at the PBX 12 to establish a connection (via the SBC 26 at the data center 8) with the trunk switch 30 at the MT PBX 22 of the data center 8. The trunk switch 20 of the PBX 12 and the trunk switch 30 of the MT PBX 22 can establish a trunk (e.g. a SIP trunk or a tie trunk). Moreover, the trunk switch 30 of the MT PBX 22 can forward signaling to the switch 28 of the MT PBX 22 requesting that a communication session with the remote RO 32 be opened. The switch 28 can control the signaling and establish the communication session with the remote RO 32 that traverses the SBC 26. Thus, a bidirectional communication session between the first RO 14 of the first premises 6 and the remote RO 32 can be established. The bidirectional communication session can provide for communications of audio, video and data between participating ROs. Additionally, the MT service 24 can communicate with the MTMS 36 to implement the billing services.

In a similar manner, in the second example, if a user of the remote RO 32 dials the federated DN of the Nth RO 14 of the first premises 6, the MT service 24 can cause the switch 28 of the MT PBX 22 to provide signaling information for the call to the trunk switch 30 of the MT PBX 22. In response, the MT PBX 22 can open a trunk with the trunk switch 20 of the PBX 12 of the first premises 6. The trunk switch 20 of the PBX 12 of the first premises 6 can cause the switch 16 of the PBX 12 to open a communication session with the Nth RO 14 at the first premises 6.

In the second example, upon expiration of the time frame (if any) determined at the initial setup, the MTMS 36 can cause the MT service 24 to discontinue establishing communication sessions between an RO 14 of the first premises 6, the Kth premises 6 and the remote site 10. In some examples, the MTMS 36 can cause the MT service 24 to simply disable such communication sessions. In other examples, the MTMS 36 can cause the MT service 24 and/or MT PBX 22 to remove the federated DNs from a directory.

In the first and second examples, ROs 14 at the first premises 6, the Kth premise and the remote site 10 can have the same DN (extension number) while still having different federated DNs (system ID plus the extension number) such that the first premises 6, the Kth premise 6 and the remote site 10 can have overlapping dial plans. In this manner the data center 8 (e.g., a cloud service provider) can support multiple customers on a purely cloud system, a physical network, or a hybrid cloud. Thus, as explained, the data center 8 can support multiple tenants 4 with overlapping dialing plans (e.g., ROs with the same DN) since the system ID (e.g., associated with an extension prefix) can be included in the federated DN.

Additionally, as noted, by providing the MT service 24 in response to a user request via the web portal 38 of the MTMS 36, the MT service 24 can be provided intermittently. Thus, operators of the tenants 4 can avoid purchasing hardware that may only be used infrequently. Moreover, since the data center 8 can be implemented on a cloud, administration and/or maintenance costs related to the MT service 24 can be reduced.

The system 2 provides a great deal of flexibility in design and implementation. For instance, in some situations, some or all of the tenants 4 may be considered to be "pure cloud" tenants 4, where only ROs are deployed (e.g. physically located) at a corresponding premise. In a pure cloud tenant 4, switches and services as well as management of the ROs can be deployed through the data center 4. Additionally, some or all of the tenants 4 may be considered to be "hybrid cloud" tenants 4, where the ROs and a limited amount of hardware (e.g., a trunk switch) is deployed at a corresponding premise. Yet further, in some situations, some or all of the tenants 4 may be considered to be "cloud interoperable" tenants 4, where a full complement of hardware is deployed at the premise (e.g., the PBX 12) and the cloud interoperable tenant 4 can communicate with a cloud RO through the data center 4 in a manner described herein. Still further, some or all of the tenants 4 may be considered to be "premises based" tenants 4, where all hardware and management of a PBX 12 is implemented at a corresponding premises (e.g., on site).

Figure 3:
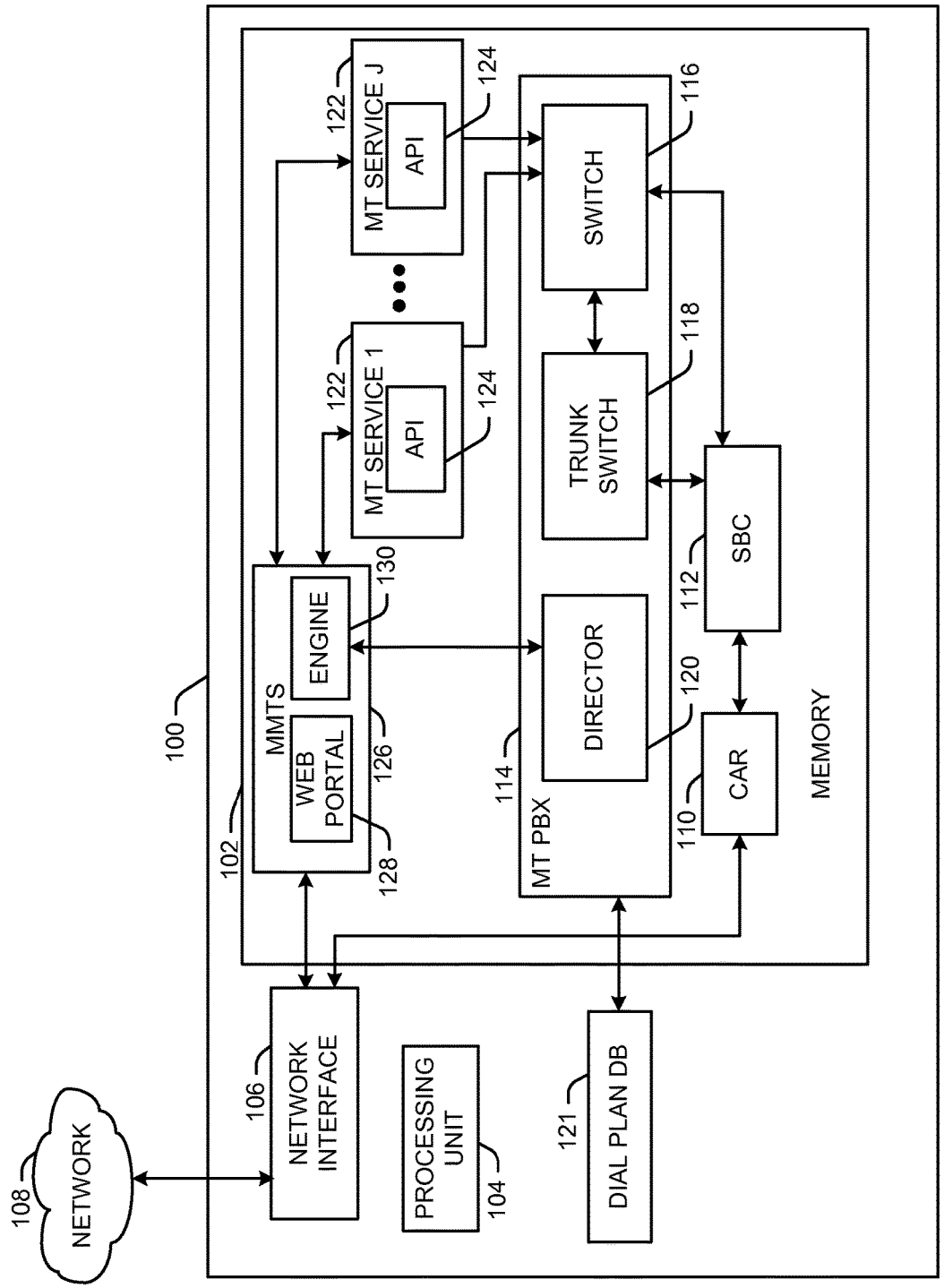
FIG. 3 illustrates an example of a data center.

FIG. 3 illustrates an example of a data center 100 that could be employed, for example to implement the data center 8 illustrated in FIG. 1. The data center 100 can include a memory 102 that can store machine readable instructions. The memory 102 could be implemented, for example, as non-transitory computer readable media, such as volatile memory, nonvolatile memory or a combination thereof. The data center 100 can also include a processing unit 104 to access the memory 102 and execute the machine-readable instructions. The processing unit 104 can include, for example, a processor core. The data center 100 can include a network interface 106 (e.g., a network card) configured to communicate with a network 108, such as a public network (e.g., the Internet) a private network (e.g., a dedicated connection) or combination thereof.

The data center 100 could be implemented, for example as a computing cloud. In such a situation, features of the data center 100, such as the processing unit 104, the network interface 106, and the memory 102 could be representative of a single instance of hardware or multiple instances of hardware with applications executing across the multiple of instances of hardware. Alternatively, the data center 100 could be implemented on a single dedicated server.

The data center 100 can communicate with multiple tenants via the network 108. For example, the data center 100 can communicate with K number of premises (e.g., the K number of premises 6 illustrated in FIG. 1) and/or a remote site (e.g., the remote site 10 illustrated in FIG. 1). In some examples, communications with the multiple tenants can be funneled through a customer access router (CAR) 110. The CAR 110 can be implemented as a hardware unit or a software module that can provide and maintain a secure tunnel for communication between a tenant of the multiple tenants and the data center 100. In some examples, each tenant can also include a CAR 110, wherein either the CAR 110 at the data center 100 or the CAR at the tenant can instigate the secure tunnel. Additionally, in some examples, the CAR 110 at the data center 100 can be a CAR terminator (CART) that terminates tunnels from the tenants. The CART 110 operating at the data center 100 may operate in a similar or different manner than the CAR operating at the tenant. Thus, for purposes of simplification of explanation, the terms CAR and CART are used interchangeably. The CAR 110 can communicate with the multiple tenants via the network interface 106.

Similarly, communication from the CAR 110 can be funneled through an SBC 112 of the data center 100. As noted, the SBC 112 can be configured to exert control over the signaling and/or media streams involved in setting up, conducting, and tearing down telephone calls or other types of communication sessions. Additionally, the SBC 112 can operate as a firewall for the data center 100. The SBC 112 can monitor communications with the data center 100 and external systems to prevent, for example, malicious code, denial of service (DoS) attacks or the like. The SBC 112 can also facilitate connectivity between networks, such as NAT traversal, SIP normalization, network protocol translation, QoS control or the like.

The data center 100 can include a MT PBX 114 that controls communication between the data center 100 and a tenant, as well as communications between tenants. Moreover, in some examples, the MT PBX 114 can control communication between an RO (e.g., a remote RO) and another communication endpoint, such as a communication endpoint not associated with the data center 100 (e.g., a third party coupled to the PSTN). In such a situation, the remote RO could be implemented as a cloud RO.

The MT PBX 114 can include one or more switches 116 that can control signaling to and from the remote RO (e.g., a cloud RO) and one or more trunk switches 118 of the MT PBX 114. The remote RO can have, for example, a DN (e.g., an extension) assigned thereto. Additionally, the remote RO can have a system ID (e.g., associated with an extension prefix) corresponding to the remote site of the remote RO. In some examples, the system ID of the remote site of the remote ID can be the same as the system ID of the data center 100. In other examples, the system ID of the remote site of the remote ID can be the same as the system ID of a corresponding premises in which the remote RO is registered to operate. The system ID and the DN of the remote RO can collectively be referred to as a federated DN.

The one or more trunk switches 118 of the MT PBX 114 can control SIP trunking and/or tie trunking to other tenants, such as one or more of the K number of premises 6 illustrated in FIG. 1. As noted, such communication can be funneled through the SBC 112, the CAR 110 and the network interface 106. The MT PBX 114 can include a director 120 configured to manage a dial plan of the multiple tenants communicating with the data center 100. In some examples, the director 120 can communicate with a dial plan database (DB) 121 that can store the DN of each RO of a tenant, as well as a system ID (e.g., associated with an extension prefix) for each RO of each tenant, such that the dial plan DB 121 can include a federated DN for each RO of each of the multiple tenants. Additionally, in some examples, the dial plan DB 121 can specify rules for assigning DNs to ROs. In this manner, each RO can be identified from the federated DN or vice versa. In some examples, the dial plan DB 121 can be partitioned as an array of federated dial plans, wherein each federated dial plan is associated with a different tenant. The director 120 of the MT PBX 114 can also be configured to program the one or more trunk switches 118 and the one more switches 116 based on federated dial plans in the dial plan DB 121.

The data center 100 can include J number of MT services 122 that could be deployed to the multiple tenants on a per-needed basis, where J is an integer greater than or equal to one. Each of the J number of MT services 122 can include an API 124. Each API 124 can be utilized by ROs of authorized tenants to access functions and methods corresponding to the respective services 122 according to terms of service.

For example, one of the MT services 122 could be a unified conference bridge. The unified conference bridge can be implemented, for example, to provide audio and/or video conferencing between ROs and other communication endpoints (e.g., third parties). Another of the J number of MT services 122 could be an instant messaging service that allows ROs to sends and receive instance messages. The instant messages could be provided, for example, as short message service (SMS) messages, proprietary text messages or the like. Additionally, in some examples, another of the J number of MT services 122 could be connect service that can cause the MT PBX 114 to operate as a bridge between multiple tenants, such as between a premises and the remote site and/or between premises.

Still another of the J number of MT services 122 could be an MT enterprise contact center (ECC) that can be employed to provide call/contact center capabilities for tenants. Additionally or alternatively, the MT ECC can be employed to facilitate multimedia call center solutions. In some examples, the MT ECC can be implemented to facilitate operation of a call center. In such a situation, operations for a call center can include, but are not limited to controlling signaling and routing of incoming calls (e.g., to an appropriate agent of the call center), that can include, for example, menu selection, number identification or the like. In this manner, the MT ECC could be configured to provide menu options to an incoming caller (e.g., to determine a particular agent or type of agent needed), and route (based, for example, on selected menu options) the incoming caller to the appropriate RO that could be located at a premises or a remote site.

Still further, the call center capabilities can be provided by the MT ECC in terms of call center agents. For example, call center agents may reside at the premise and/or remote sites. One or more ROs and/or one or more Remote ROs may be configured as a call center agent and the MT ECC can further be configured such that calls are routed to the appropriate RO be based upon factors such as the nature of the call (or other form of contact), the skill of the agent, the agent's availability, and the like.

In some examples, a cloud based MT ECC can deploy services to implement a Hybrid Contact Center. In one example a standalone PBX/ECC system can be implemented or each tenant by the cloud based MT ECC, and the standalone system can federate with a premises based system via SIP tie trunks. In this situation, agents can remain registered at the PBX of the premises. Enhancements could be recommended to SIP trunking to exchange call global unique identifiers (GUIDs), and to expose premise transfer/conference activity to the cloud based MT ECC.

In another example, the MT ECC can attach ECC services to a hybrid MT PBX (e.g., the MT PBX 114). In this situation, no enhancements are needed and hybrid agents can be implemented as "federated users" registered with the MT PBX 114. In contrast to an entire PBX with a SIP switch for each customer, this approach recommends just a single ECC per tenant (customer).

The data center 100 can include a MTMS 126 that can facilitate administration of the J number of MT services 122 via the API 124 of the J number of MT services 122. The MTMS 126 can include a publicly accessible web portal 128. The web portal 128 can include a user login. The web portal 128 can provide, for example, a GUI. Upon logging in, a user of one of the multiple tenants, such as a premises can request that a selected service (or more than one service) of the J number of MT services 122 be provided to the premises. Additionally, the user can provide a time frame to provide the selected service, as well as a list of users and/or ROs authorized to employ the selected MT service 122.

In response, an engine 130 of the MTMS 126 can request a dial plan from the premises. The engine 130 of the MTMS 126 can be implemented, for examples, as a service management engine and/or a service control engine. The engine 130 can also include an API configured to control functionality of the engine 130. In response to the request for the dial plan, a dial plan can be provided from a PBX of the premises to the engine 130 of the MTMS 126. In some examples, the engine 130 of the MTMS 126 can add a system ID (e.g., associated with an extension prefix) to DNs within the dial plans for each of the ROs in the dial plan to form a federated dial plan that includes federated DNs for each of the ROs. Additionally, the engine 130 of the MTMS 126 can configure the selected MT service 122 via the engine 124 of the selected MT service 122 to deploy the selected service to the appropriate premises and ROs. Moreover, the engine 130 of the MTMS 126 can extract relevant information (e.g., username, password, a federated DN or the like) from the engine 124 of the selected MT service 122.

Moreover, the engine 130 of the MTMS 126 can also push the dial plan with the federated DNs to the director 120 of the MT PBX 114. In response, the director 120 can write the federated dial plan into the dial plan DB 121. Additionally, the director 120 can provide the engine 130 of the MTMS 126 with a list of federated DNs needed to implement the selected service. For instance, the federated DNs can include, a federated DN for a conference bridge, a federated DN for the ECC, a list of federated DNs for RO selected in another premises or remote site, or the like.

In response to the list of federated DNs needed to implement the selected service, the engine 130 of the MTMS 126 can push the federated DNs extracted from the selected MT service 122 to the director 120 of the PBX at the premises (or other tenant) as well as other relevant information extracted from the selected MT service 122. Additionally, the director 120 of the MT PBX 114 can program/configure the one or more trunk switches 118 to route calls from DNs in the federated dial plan associated with the premises to an appropriate destination (e.g., the selected service).

For example, upon receiving an incoming call to a federated DN associated with the selected MT service 122, the one or more trunk switches 118 can route the incoming call to the selected MT service 122 via the one or more switches 116 associated with the selected MT service 122. The selected MT service 122 can examine the incoming call to determine whether the RO (or other communication endpoint) has authorization to access the selected MT service 122. If authorization is allowed, the selected MT service 122 can be provided to the incoming call. This can continue until expiration of the time frame selected by the user during setup of the selected MT service 122. Additionally or alternatively, MT service 122 can disable the providing of the selected MT service 122 prior to the expiration of time. Such a situation can arise, for example, due to an agreement to terminate of the MT service 122 early, abuse, unauthorized access, payment disputes or the like.

Upon expiration of the time frame, the engine 130 of the MTMS 126 can signal the engine 124 of the selected MT service 122 to disable the selected service. In response, the MT service 122 can disallow further requests for the selected service so that the routing of calls can be easily reinstated at a later time. Additionally, in some examples, the director 120 can program the one or more trunk switches 118 to discontinue the routing of calls to the selected MT service 22 and/or routing of calls to other ROs. In some examples, the director 120 can be configured to remove the federated dial plan associated with the premises from the dial plan DB 121.

By employing the data center 100, each of the J number of MT services 122 can be provided to each of the multiple tenants (or some subset thereof) of the data center 100 concurrently. Moreover, by including the system ID as part of the federated DN for each RO, ROs at different tenants can have the same DN (e.g., overlapping dial plans) without conflict. Additionally, as noted, the data center 100 can be implemented on a cloud computing environment or in a standard network environment. Moreover, one or more of the multiple tenants can also be implemented in a cloud computing environment, and one or more of the multiple tenants can be implemented as physical hardware (e.g., in a physical network environment). Thus, the data center 100 can be implemented in a pure cloud computing environment, a pure physical network environment or a hybrid cloud environment.

Figure 4:
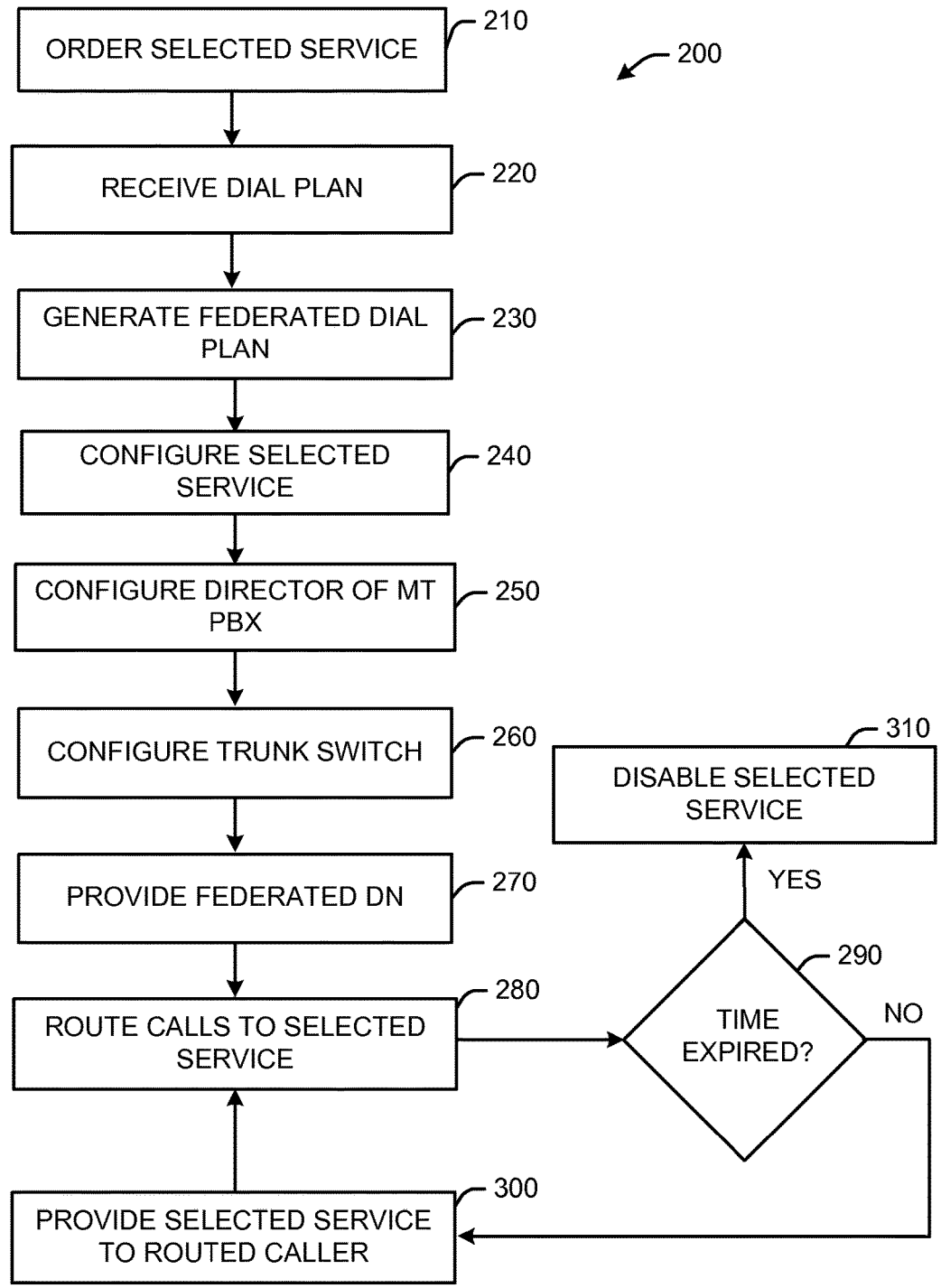
FIG. 4 illustrates a flowchart of an example method for providing a multi-tenant service.

In view of the foregoing structural and functional features described above, example methods will be better appreciated with reference to FIG. 4. While, for purposes of simplicity of explanation, the example methods of FIG. 4 are shown and described as executing serially, it is to be understood and appreciated that the presence examples are not limited by the illustrated order, as some actions could in other examples occur in different orders, multiple times and/or concurrently from that shown and described herein. Moreover, it is not necessary that all described actions be performed to implement a method. The example methods of FIG. 4 can be implemented as instructions stored in a non-transitory machine-readable medium. The instructions can be accessed by a processing resource (e.g., one or more processor cores) and executed to perform the methods disclosed herein.

FIG. 4 illustrates an example of a method 200 for providing a selected service. The method 200 could be implemented, for example, by the enterprise system 2 illustrated in FIG. 1 and/or the data center 100 illustrated in FIG. 3. At 210, a selected service can be ordered (e.g., by a user of the first premises 12 of FIG. 1) at a MTMS (e.g., the MTMS 36 of FIG. 3). The order for the services can include, for example, as list of ROs and/or users authorized to access the selected service and a time frame for the services. Additionally, the order for the services can include billing information that characterizes a billing agreement for the selected services.

At 220, a dial plan can be received (e.g., at the MTMS) from a director of a PBX (e.g., the director 18 of FIG. 1) that includes the DNs associated with ROs at the premises. At 230, a federated dial plan can be generated (e.g., by the MTMS) for the premises that includes a list of federated DNs (e.g., a system ID and a corresponding DN) for each RO at the premises.

At 240, the selected service (e.g., one or more of the J number of services 122 illustrated in FIG. 3) can be configured (e.g., by the MTMS). In particular, the MTMS can indicate the selected time frame and the list of ROs that are authorized to access the selected service. At 250, a director (e.g., the director 120 of FIG. 3) of an MT PBX (e.g., the MT PBX 114 of FIG. 3) can be configured (e.g., by the MTMS). The configuration of the director can include, for example, pushing the federated dial plan to the director. At 260, a trunk switch (e.g., the one or more trunk switches 118 of FIG. 3) can be programmed and/or configured (e.g., by the director) to implement SIP trunking and/or tie trunking to route calls from the federated DNs of the premises (or some subset thereof) to the selected service.

At 270, a federated DN for the selected service can be provided (e.g., by the director of the MTMS) to the director of the PBX at the premises. At 280, incoming calls directed to the federated DN associated with the selected service can be routed (e.g., by the trunk switch of the MT PBX) to the selected service. At 290, a determination can be made (e.g., by the MTMS) as to whether time has expired based on the time frame selected at 210. If the determination at 290 is negative (e.g., NO) the method 200 can proceed to 300. If the determination at 290 is positive (e.g., YES) the method can proceed to 310.

At 300, the selected service can be provided to the caller routed to the selected service at 280 (e.g., by the selected service). The selected service could be, for example a unified conference bridge, instant messaging, connect service, an ECC or the like. The providing of the selected services can include, for example, allocation of resources (e.g., software and/or hardware resources) at the enterprise system to the caller to implement the selected service. For instance, providing of the selected service can include operations related to interaction with the caller, and/or controlling operations of other systems (e.g., the MT PBX) to route the caller to another destination. Providing of the selected service can also include, for example a recording of billing information based on the services rendered, and the method 200 can return to 280. At 310, the selected service can be disabled (e.g., by the MTMS). In some examples, the MTMS can simply notify the director and/or the selected service to discontinue routing calls and/or providing the selected service. In this manner, configuration for the selected service can be retained thereby allowing the selected service to be easily re-enabled at a later time.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer readable medium storing machine readable instructions comprising:
   a multi-tenant management service configured to:
      receive a plurality of requests for a multi-tenant service from a plurality of tenants, wherein a given and another of the plurality of tenants each have a resource object (RO) both with the same dialable number (DN) assigned thereto;
      generate a federated dial plan for each of the plurality of tenants, wherein each federated dial plan includes a system identifier and a corresponding DN for each RO associated with a respective tenant, the federated dial plan to enable unique addressing of each RO and the multi-tenant service that are served by the multi-tenant management service, including where one or more of the same DNs are employed at multiple tenants; and
      provide a federated DN corresponding to the multi-tenant service to each of the plurality of tenants to enable access to the multi-tenant service by at least one RO of more than one of the plurality of tenants.

2. The medium of claim 1, wherein the multi-tenant management service comprises a web portal configured to provide a graphical user interface (GUI) to facilitate selection of the multi-tenant service.

3. The medium of claim 2, wherein the GUI enables selection of a time frame to provide the multi-tenant service.

4. The medium of claim 1, wherein the multi-tenant management service is further configured to receive a dial plan from each of the plurality of tenants, wherein each dial plan includes a DN for each RO associated with a respective tenant and each respective federated dial plan is generated based on a corresponding dial plan received from each of the plurality of tenants.

5. The medium of claim 4, wherein each dial plan further includes rules for assigning DNs to ROs.

6. The medium of claim 4, wherein the multi-tenant service is further configured to:
uniquely identify a given RO associated with a given one of the plurality of tenants based on the system identifier and the DN of the given RO; and
uniquely identify another RO associated with another one of the plurality of tenants based on the system identifier and the DN of the other RO, wherein the given RO and the other RO have the same DN.

7. The medium of claim 1, wherein the multi-tenant service is further configured to provide the plurality of federated dial plans to a director of a multi-tenant private branch exchange (MT PBX), wherein the director of the MT PBX is configured to program a trunk switch of the MT PBX based on each of the federated dial plans and the multi-tenant service.

8. The medium of claim 7, wherein the trunk switch of the MT PBX is configured to control routing of incoming calls based the system identifier and the DNs of each of the federated dial plans.

9. The medium of claim 7, wherein the director of the MT PBX is further configured to provide the multi-tenant management service with a federated DN corresponding to the multi-tenant service, and wherein the multi-tenant management service is configured to provide a director of a private branch exchange (PBX) of each of the plurality of tenants with the federated DN corresponding to the multi-tenant service.

10. The medium of claim 1, wherein the multi-tenant service is a unified conference bridge.

11. The medium of claim 1, wherein the multi-tenant service is an instant messaging service.

12. The medium of claim 1, wherein the multi-tenant service is a connect service, and the connect service is configured to program a multi-tenant private branch exchange (MT PBX) to route an incoming call directed to a federated DN associated with a given RO implemented on a cloud computing environment to a switch associated with the given RO.

13. The medium of claim 1, wherein the multi-tenant service is an enterprise contact center.

14. The medium of claim 1, wherein the multi-tenant management service is configured to execute in a cloud computing environment.

15. A system comprising:
a multi-tenant management service configured to:
generate a federated dial plan for a tenant in response to a request for a selected service, wherein the federated dial plan includes a system identifier and a dialable number (DN) for each resource object (RO) associated with the tenant, the federated dial plan to enable unique addressing of each RO served by the multi-tenant management service, including where one or more of the same DNs are employed at multiple tenants;
provide the federated dial plan for the tenant to a multi-tenant private branch exchange (MT PBX); and
provide the federated DN for the selected service to a private branch exchange (PBX) of the tenant to enable access to the selected service by at least one RO of the tenant via the PBX of the tenant,
wherein the MT PBX comprises a multi-tenant director configured to program a trunk switch of the MT PBX such that a call to the federated DN of the selected service from the at least one RO of the tenant is routed to the selected service.

16. The system of claim 15, wherein the PBX of the tenant comprises a premise-based director configured to:
receive the federated DN of the selected service; and
program a trunk switch of the tenant such that calls directed to the federated DN of the selected service are routed to the MT PBX of the system.

17. The system of claim 16, wherein the PBX is associated with a given premises and the multi-tenant management service is configured to provide a federated dial plan for another premises to the PBX of the given premises.

18. The system of claim 16, wherein a connect service is configured to program the MT PBX such that an incoming call directed to a given RO associated with a remote site implemented in a cloud computing environment is routed to a switch associated with the given RO.

19. The system of claim 16, wherein the federated DN of the selected service is provided to the premises based director via a session initiation protocol (SIP) message.

20. The system of claim 15, wherein the selected service is a unified conference bridge.

21. The system of claim 15, wherein the multi-tenant management service further comprises a web portal configured to provide a graphical user interface (GUI) to enable a user to select the selected service.

22. The system of claim 21, wherein the web portal provides billing information for the selected service to the user.

23. The system of claim 15, further comprising a customer access router (CAR) configured to provide secure communications between the tenant and the multi-tenant management service residing in a data center.

24. A method comprising:
receiving a dial plan from a tenant in response to ordering a selected service, wherein the dial plan includes a dialable number (DN) for a plurality of resource objects (ROs) of the tenant;
generating a federated dial plan comprising federated DNs that include the DNs for each of the plurality of ROs at the tenant and a system identifier for the tenant and a federated DN for the selected service, such that unique addressing of each RO and the selected service is enabled, including where one or more of the same DNs are employed concurrently at multiple tenants; and
providing the federated DN for the selected service to a private branch exchange (PBX) of the tenant to enable access to the selected service by at least one RO of the tenant via the federated DN.

25. The method of claim 24, wherein the PBX of the tenant is deployed at a given premises of the tenant and the method further comprises providing a federated dial plan of the given tenant to a PBX of another premises of the tenant to facilitate deployment of a connect service shared by the given premises and the other premises.

\* \* \* \* \*